(12) United States Patent  
Robbins

(10) Patent No.: US 7,648,094 B2  
(45) Date of Patent: Jan. 19, 2010

(54) CONDIMENT GRINDER AND DISPENSER

(75) Inventor: Rodney W. Robbins, Florence, AL (US)

(73) Assignee: Fox Run USA, LLC, Ivyland, PA (US)

( * ) Notice: Subject to any disclaimer, the term of this patent is extended or adjusted under 35 U.S.C. 154(b) by 82 days.

(21) Appl. No.: 11/891,181

(22) Filed: Aug. 9, 2007

(65) Prior Publication Data

US 2009/0039188 A1    Feb. 12, 2009

(51) Int. Cl.  
*A47J 42/34* (2006.01)
(52) U.S. Cl. .................................................. 241/169
(58) Field of Classification Search .............. 241/168, 241/169, 169.1  
See application file for complete search history.

(56) References Cited

U.S. PATENT DOCUMENTS

| | | | |
|---|---|---|---|
| 4,573,244 A | 3/1986 | Holcomb et al. | |
| 4,697,749 A | 10/1987 | Holcomb et al. | |
| 4,771,955 A * | 9/1988 | Paulson | 241/169.1 |
| D392,517 S | 3/1998 | Holcomb et al. | |
| D448,257 S | 9/2001 | Stewart et al. | |
| D452,997 S | 1/2002 | Holcomb et al. | |
| D453,096 S | 1/2002 | Stewart et al. | |
| 6,511,006 B1 | 1/2003 | Holcomb et al. | |
| 6,672,524 B1 | 1/2004 | Holcomb et al. | |
| 6,871,808 B2 | 3/2005 | Holcomb et al. | |
| 7,210,643 B2 | 5/2007 | Holcomb et al. | |

* cited by examiner

*Primary Examiner*—Mark Rosenbaum  
(74) *Attorney, Agent, or Firm*—Gregor N. Neff, Esq.

(57) ABSTRACT

Peppercorns and coarse salt are selectively stored, ground and dispensed. Two squeeze-levers are provided for actuating the grinder, with a lock for selectively disabling one of them so that only one condiment is dispensed at a time. Means is provided for increasing the quantity of condiment ground for each stroke of the grinder lever.

12 Claims, 5 Drawing Sheets

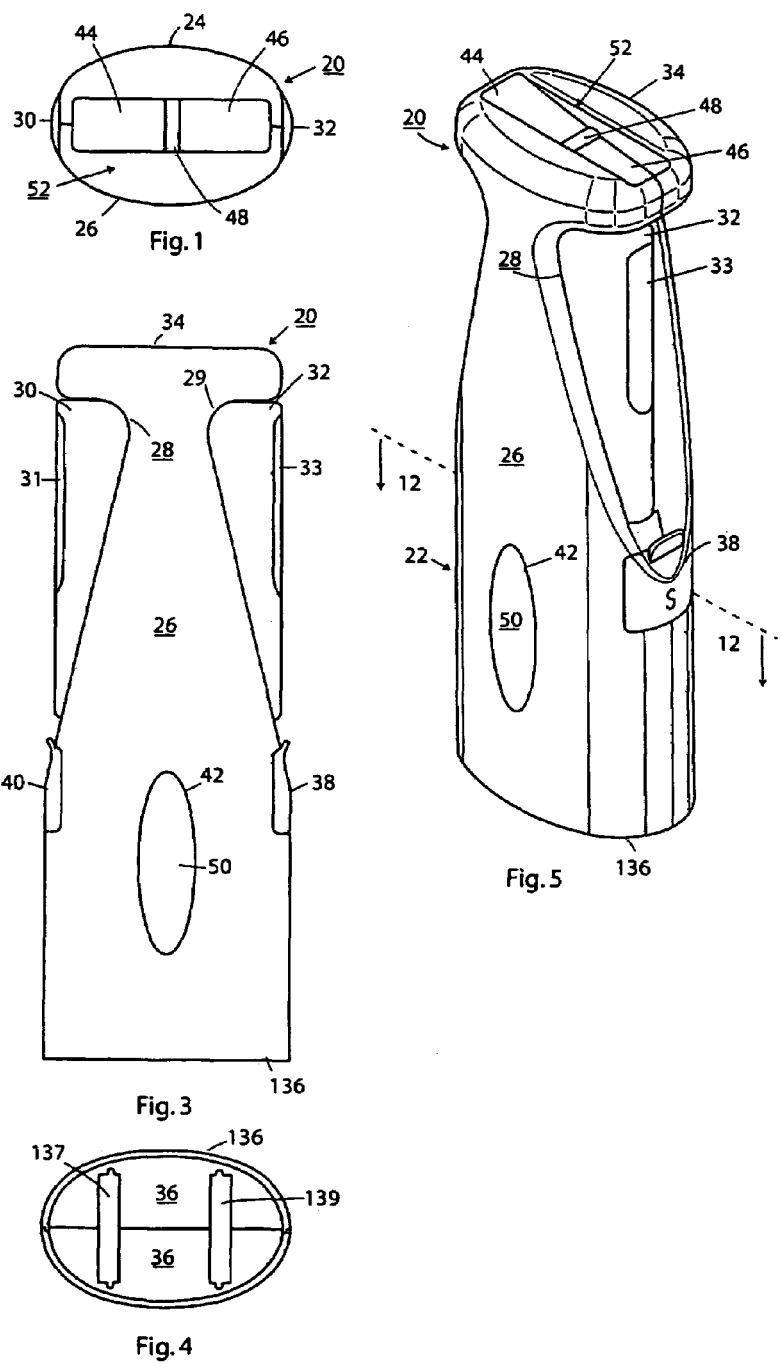

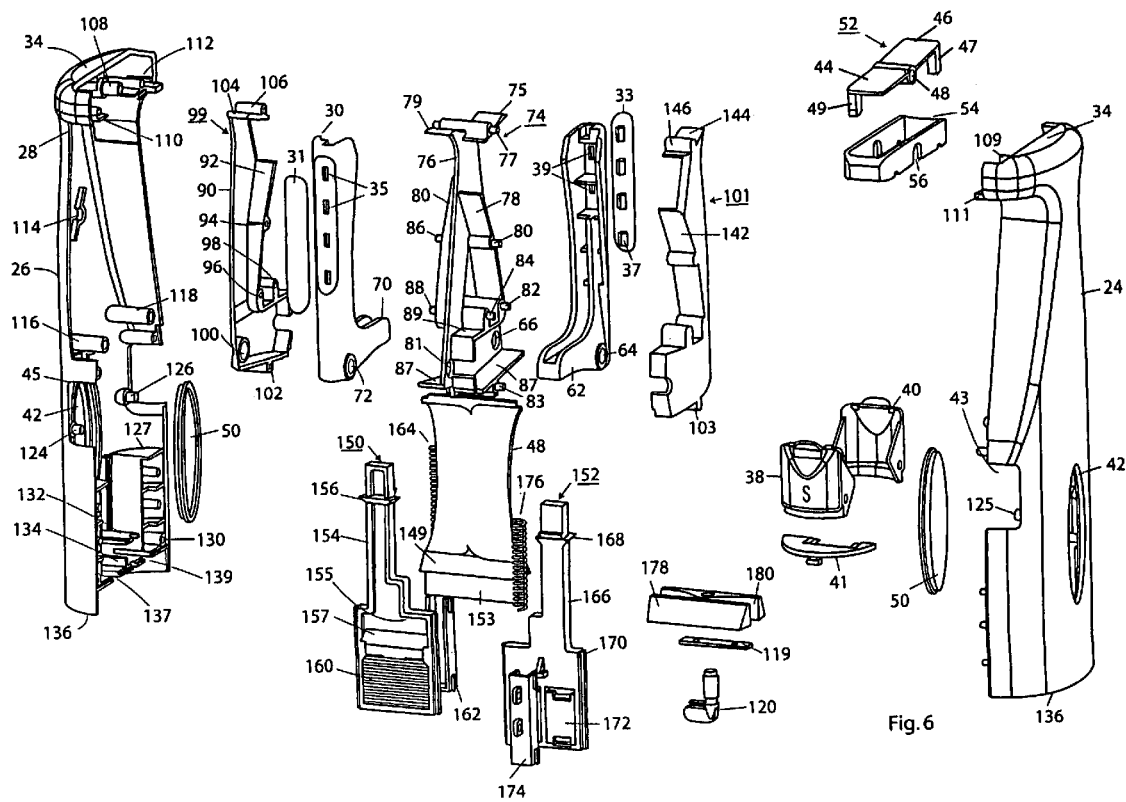

CONDIMENT GRINDER AND DISPENSER

This invention relates to condiment grinders and dispensers, and particularly to such grinders and dispensers which are adapted to grind and dispense at least two different condiments, such as salt and pepper.

Grinders/dispensers for alternatively grinding and dispensing either salt or pepper from the same unit currently are being sold. Typically, each unit stores both unground peppercorns and coarse salt. Two levers extend upwardly from the top of the unit. One of the levers is stationary and the other is movable. The levers can be gripped and squeezed together to grind either salt or pepper, which is dispensed from the bottom of the unit.

In order to change the selection of which condiment is to be dispensed, the assembly of levers on the top of the unit must be rotated 180° to move the actuating lever into position to grind a different one of the condiments and dispense it.

One of the problems with such a dispenser is that the levers extend upwardly and outwardly from the unit by a substantial distance, making the device ungainly and relatively easy to tip over.

Another problem with such prior art dispensers is that they do not dispense large quantities of ground condiments with each stroke, meaning that it takes a substantial amount of time and effort to dispense a desired quantity of the condiment.

A further problem with such prior devices is that they often require the use of both hands in order to switch from grinding one condiment to the other, thus making the unit relatively difficult to use.

Accordingly, it is an object of the present invention to provide a condiment grinder and dispenser which overcomes the foregoing problems.

In particular, it is an object to supply such a grinder/dispenser which is relatively sleek and compact and less prone to being in the way and/or tipping over easily.

It is another object of the present invention to provide such a grinder/dispenser that delivers larger quantities of ground condiments with each operation of the dispensing mechanism, and thus is faster and easier to use in dispensing a given amount of condiment.

It is a further object of the invention to provide a dispensing grinder for multiple condiments in which the selection of condiments can be changed with one hand—the same hand which is used to actuate the dispensing mechanism.

Another object of the invention is to provide such a device which is relatively compact, easy and reliable to operate, and relatively inexpensive to manufacture.

In accordance with the present invention, the foregoing objects are met by the provision of a multiple condiment grinder/dispenser in which a separate actuating lever is provided in the body of the unit for grinding each of the different condiments. A locking mechanism is provided to disable one of the levers while the other one is operative. This enables the user to grip both levers simultaneously and squeeze to actuate only the selected lever.

Preferably, a toggle type locking mechanism is provided to alternatingly lock one or the other of the two actuating levers. This can be done with one hand, the same hand which is used to operate the desired lever.

Preferably, the grinding mechanism also has a structure which presses downwardly on the mass of stored condiment to be ground so as to significantly increase the amount of material ground with each stroke of the actuating lever, thus increasing the speed and ease of dispensing a given quantity of material.

Preferably, the grinder/dispenser has storage bins adapted to use the weight of stored materials to maximize the pressure applied to the materials to be ground so as to improve the rate of grinding and dispensing per stroke of operation. The storage bins preferably are located in the housing's center, between spaced-apart grinding rasps, with steeply angled bottom walls.

The foregoing and other objects and advantages of the invention will be set forth in or apparent from the following description and drawings.

IN THE DRAWINGS

FIGS. 1, 2, 3, 4 and 5 are, respectively, a top plan view; a left side elevation view; a front elevation view; a bottom plan view; and a perspective view of a condiment grinder and dispenser of the present invention;

FIG. 6 is an exploded view of the device shown in FIGS. 1-5;

GENERAL DESCRIPTION

Figure 7:
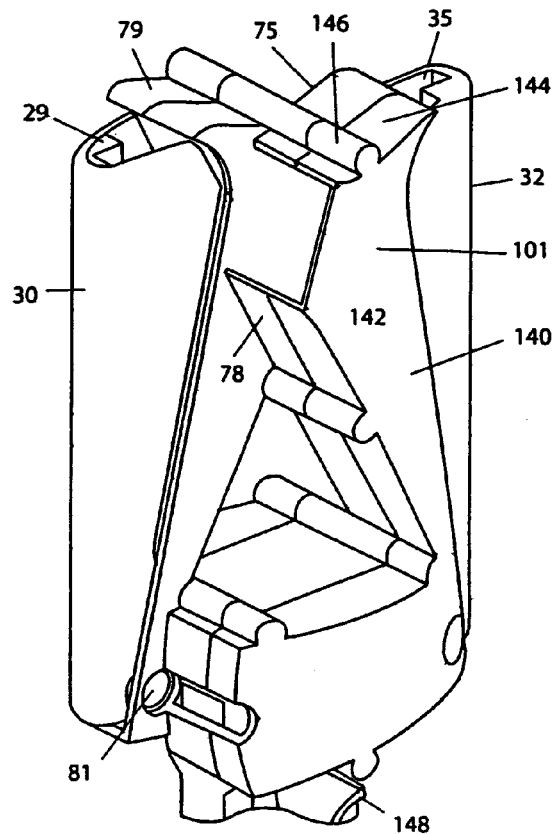
FIGS. 7 and 8 are partially broken-away perspective views of partially assembled portions of the internal mechanism of the unit shown in FIGS. 1 through 6.

FIGS. 1 through 5 show a dual condiment grinding and dispensing device 20.

The device 20 has a housing, generally indicated at 22 in FIG. 5, which is made up of two halves 24 and 26 (see FIGS. 1-3). Two levers 30 and 32 are mounted, respectively, into tapered recesses 28, 29 (FIG. 3) in the housing.

The two levers 30, 32 preferably are colored differently from one another so as to enable the user to tell them apart to know which of the two levers dispenses which of the two different condiments. In the drawings, the levers 30, 32 are shown shaded differently to indicate this difference in color. Each of the levers has a grip 31 or 33 made of a high-friction material such as silicone rubber or the like.

Each half of the unit 20 has a transparent window 50 mounted in an oval opening 42 in the side wall of the housing to allow the quantity of the condiments stored in the housing to be seen.

Alternatively, the entire body of the dispensing unit can be made of transparent plastic material so as to make the entire mechanism visible, including the stored materials.

At the left and right sides of the unit 20 are hinged doors 40 and 38 which can be swung downwardly through an angle of 45° or so as to allow filling the internal storage bins with quantities of the two condiments. One door 40 is marked with the letter "P" to indicate the filling door for peppercorns, and the other door 38 is marked with the letter "S" to identify it as the door for use in filling the salt bin in the unit 20. The unit 20 also has a bottom edge 136 and a top surface 34.

Mounted in the top surface 34 is a locking mechanism 52 (see FIGS. 1, 5 and 11) which is used in selecting which of the two condiments is to be dispensed.

Referring to FIG. 4, the bottom edges 137 and 139 of two rasp mechanisms are shown extending into two slots in the bottom wall 36 of the unit 20. Ground condiment material drops downwardly through the slots when the device 20 is operated.

The lock mechanism 52, which will be described in greater detail below, includes a toggle mechanism having a pivot axis at 48 and two actuating surfaces 44 and 46.

Figure 11:
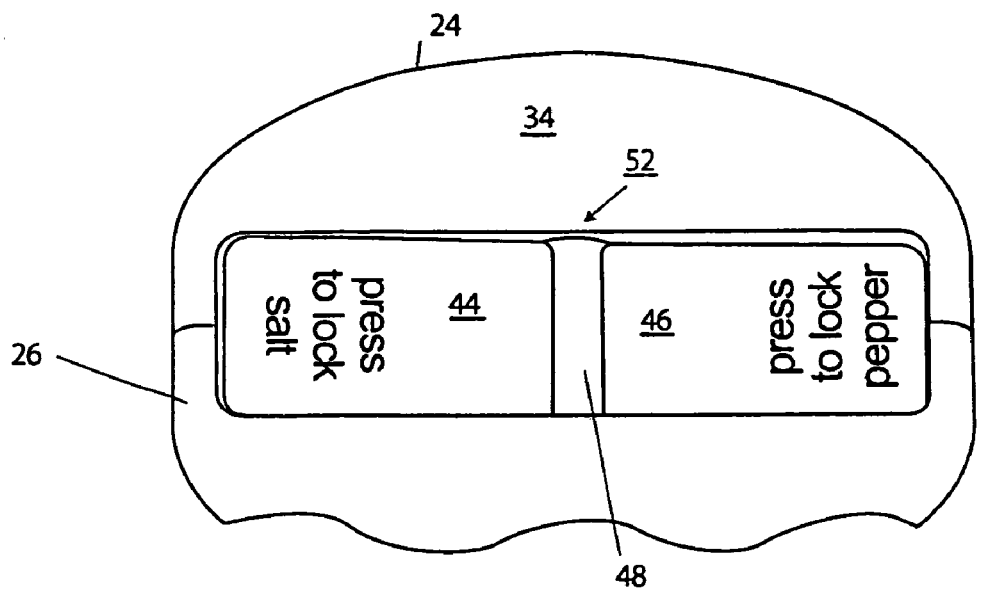
FIG. 11 is a partially broken-away enlarged top plan view of the unit shown in FIGS. 1 through 5 displaying the operating legends printed on the locking mechanism of the device.

As it is indicated in FIG. 11, one presses one of the two surfaces 44 and 46 to depress it and lock one of the levers and prevent it from operating, while enabling the other of the levers to be operated to dispense ground material. As the legend indicates in FIG. 11, if one presses the lever surface 44, this will lock the salt dispensing lever and enable the pepper lever 32 to operate to dispense pepper. Conversely, pressing the lever surface 46 will lock the pepper lever 32 and allow the salt lever 30 to operate.

As it can be seen, the two levers 30 and 32 move in planes parallel to one another so that gripping both levers simultaneously results in dispensing only one condiment.

The locking mechanism 52 is easily operable with the finger of one hand, so that selection of which condiment is to be dispensed easily can be done with one hand.

The unit 20 is relatively sleek, compact and easy to use to grind and dispense condiments.

DETAILED DESCRIPTION

Now, referring to the exploded view of FIG. 6, the internal components mounted between the two halves 24 and 26 of the grinder/dispenser housing include a central vertical support structure 74, the two levers 30 and 32, a pair of retainer inserts 99 and 101, a separator wall structure 148, and a pair of rasp structures 150 and 152.

The central vertical support 74 has a pair of angled lever stops 78 and 80 on opposite sides of a central vertical plate 76.

It should be understood that unless otherwise stated, all parts are molded of a plastic material suitable for use in holding food materials, particularly including pepper and salt.

A horizontal plate 89 extends outwardly from both sides of the plate 76 (only one such element 89 is visible in FIG. 6). The elements 89 serve as return stops for the levers 30 and 32. A plate 87 also serves as a forward stop for each of the levers.

Two relatively large holes 81 and 66 are provided in the lower portion of the plate 76. These holes are sized and positioned to receive axles 116 and 118 projecting from the interior wall of the housing half 26 to serve as pivot points for the levers 30 and 32. The surfaces 78 and 80 serve as forward stop surfaces for the upper portions of the handles 30 and 32.

The handle 30 has a lower extension arm 70 as well as a pivot hole 72. Similarly, the lever 32 has a lower extension arm 62 and a pivot hole 64.

The lever 30 has holes 35 for receiving projections for mounting the grip 31. The lever 32 has similar holes 39 and projections 37 for mounting the grip 33.

The vertical support 74 has a number of projecting pins 80, 82, 83, 84, 86, and 88 for insertion into holes, such as holes 94, 96, 98 and 102, in the units 99 and 101 to secure those elements to one another.

At the top of the vertical support 74 are flat extension plates 75 and 79, with a central element forming projecting pins 77 for mating with receptacles 146 and 106 of the units 99 and 101 for attachment purposes.

The pins 83 fit into holes and bosses 102, 103, in the units 99 and 101.

The units 99 and 101 are snap-in inserts into the two halves 26 and 24 of the housing. They are formed as separate elements for the convenience in molding them.

The units 99 and 101 are mirror images of one another. Each has a main plate 90 or 140, an angled extension 92 or 142 serving as a portion of the lever stop surface for each lever, an upper plate 104 or 144 and a large opening 100 (not shown for element 101 because it is not a through hole) through which one of the axles 116 or 118 passes.

A ridge 114 (not shown for housing half 24) is provided on the inside wall of each half of the housing, and the elements 99 and 101 snap into position in the housing with a friction fit which holds the elements 99 and 101 securely to the respective housing halves.

Figure 12:
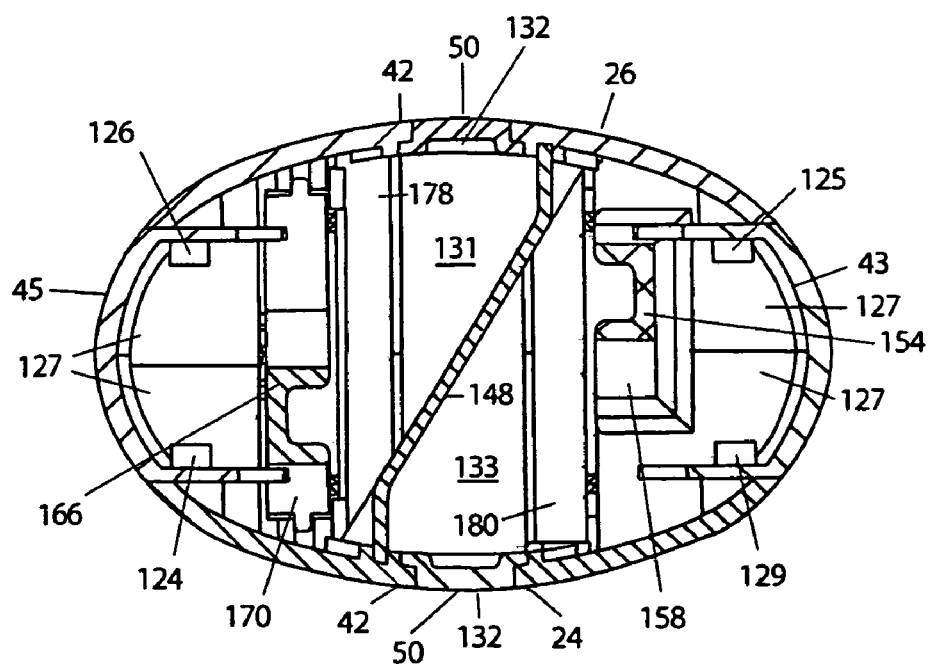
FIG. 12 is a cross-sectional view taken along line 12-12 of FIG. 5.

Horizontally-projecting cover members 127 are provided as shown in FIGS. 6 and 12.

The hinged filling doors 38 and 40 fit into rectangular cut outs 43, 45 in the edges of the two housing halves and are mounted on pivot pins such as 124, 125 and 126 so as to rotate when opened and stay shut when returned to the unopened position.

An element 41 is provided below the door 38 for the purpose of covering the area below the door 38 to prevent salt leakage.

The drawing of the latch mechanism 52 shows that the toggle plate has a pair of rectangular downwardly extending projections 47 and 49 at opposite ends. These projections fit into square holes 29 and 35 (FIG. 8) in the tops of the levers 30 and 32 so that when they enter the square holes, they lock one of the levers against movement. A receptacle 108 is provided in housing half 26 for receiving a pin 109 in housing half 24 to form a pivot axle for the toggle mechanism.

A housing 54 is provided with a slot 56 to fit over the axle 108. The device 54 serves as a housing for the lock mechanism.

Receptacles are provided on housing half 26 at 110, 112 to mate with pins such as 111 on housing half 24 to secure the two halves of the housing together at the top.

Grinding Mechanism

Still referring to FIG. 6, positioned beneath the central support 74 is a curved wall 148 (also see FIGS. 9, 10 and 12) which provides separate bins for holding the materials to be ground, as it will be explained in greater detail below.

Two rasp structures 150 and 152 are provided, one for grinding materials in one of the two storage bins, and the other for grinding the material in the other storage bin. Each rasp structure includes a vertical stem 154 or 166 with a stop member 156 or 168, a much wider lower portion 158 or 170, and a rasp section 160, 172 which, as it can be seen better in FIGS. 9 and 10, comprises a series of elongated cutting teeth.

Figure 10:
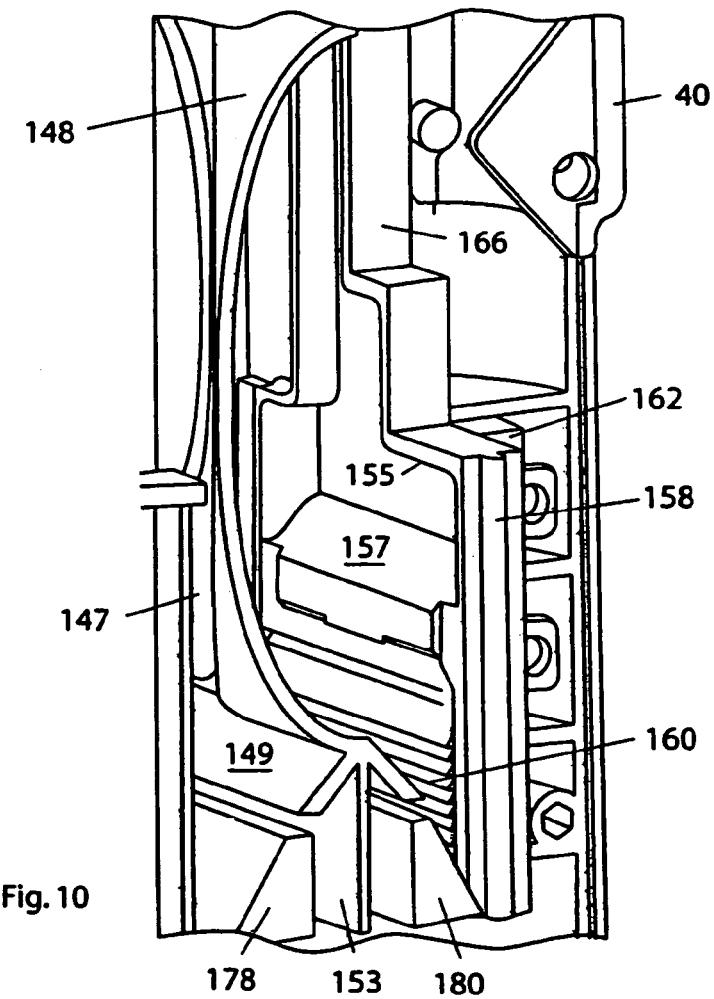

As it is shown in FIGS. 6 and 10, each of the structures 150, 152 is molded and has a recessed internal section forming a horizontal upper wall 155 and an angled lower member 157. Also provided for each of the two rasp structures is a return spring holder 169 or 174, with a helical return spring 164 or 176 which engages a projection on one of the rasp members to return it upwardly after each stroke.

A holding structure is provided inside each of the housing halves. This structure includes upper arms 132, lower ridges 134, and a support plate 128, 130 with discharge slots, 137, 139 and is provided for supporting triangular grating bearing blocks 178, 180.

Figure 9:
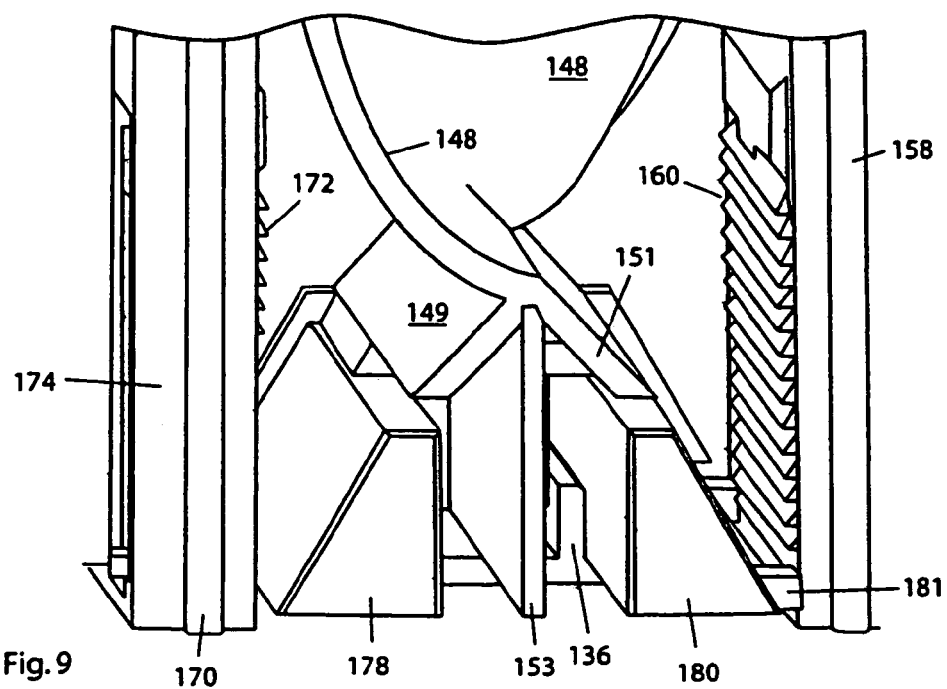
FIGS. 9 and 10 are enlarged perspective views of other portions of the mechanism of the unit shown in FIGS. 1 through 5.

Referring now to FIGS. 9, 10 and 12, the curved wall 148 forms a wall midway between two separate storage chambers 131 and 133 (FIG. 12).

Each of the triangular grater blocks 178 and 180 is positioned so as to form a restricted gap between it and the grating teeth 160 or 172 to properly grind the condiment to the desired particle size. This particle size can be made adjustable by varying the position of each of the blocks 178 or 180 closer to or farther away from the rasp teeth. An adjustment element 120 is shown in FIG. 6 for this purpose. It extends through the bottom wall 36 (not shown in FIG. 4) and operates in a known manner to adjust the position of the pepper grinding block to vary the particle size of pepper dispensed from the unit. A similar adjustment lever can be provided for the salt grinding block, if desired. A metal blade 119 is attached to the pepper grinding block for improved wear resistance.

The wall structure 148 has depending angular flanges 149, 151, and a vertical wall 153 to assist in holding the components in their proper positions.

Blocks 181 are provided for setting minimum spacing.

The hollow interior of the structures 158, 170 (e.g., the space between elements 155 and 257 in FIG. 10) is believed to be advantageous in that material to be ground and dispensed appears to be pressed downwardly by the downward stroke of each of the grinding structures so as to dispense increased quantities with each stroke of the grinding mechanism. Thus, the surface 155 and others can serve as packing members to push downwardly on the material to be ground.

It also should be noted that the lower portion of the housing 22 has a substantially vertical side wall of approximately oval cross-sectional shape, as it is shown in FIG. 12, which is a cross-sectional view taken along line 12-12 of FIG. 5.

The two rasp mechanisms 158 and 170 (see FIGS. 6 and 12) are parallel to one another and spaced apart by a substantial distance. Advantage is taken of this spacing to provide storage bins 131 and 133 for the two different condiments in the space between the rasp mechanisms.

As it is shown in FIG. 12, the two bins 131 and 133 are formed by the divider wall 148 which is curved at its bottom edges so as to deliver the condiment to the angled surfaces of the blocks 178 and 180 at a relatively steep angle along the entire length of the blocks. (Also see FIGS. 9 and 10.)

Also, it is to be noted that the housings 162 and 174 for the return springs 164 and 176 advantageously are mounted to the housing wall and located in the space between the rasp mechanisms and the outer wall. This leaves plenty of space in between the rasp mechanisms for storage of the materials to be ground. This structure is made possible by the oppositely directed actuating handles 30 and 32 which permit the spacing of the structures 150 and 152 to be wide enough to provide for storage bins. This is believed to provide an unanticipated advantage in that the storage bins can be relatively tall vertically, and the bottom wall of each bin can be steeply angled, with the result that a relatively large portion of the stored condiment to be dispensed is stored directly above, or closely adjacent to a location directly above, the point at which the materials are to be ground between the rasp surfaces and the blocks 178 and 180. It is believed that this is at least partially responsible for the improved efficiency and speed of grinding which produces a substantial improvement in the quantity of material ground and delivered with each stroke of one of the levers 30 or 32.

The wall 148 is set at an angle to the rasp members 160 and 172, as shown in FIG. 12, so as to enable the contents of only one bin to be seen through each of the windows 50. However, the wall 148 also can be parallel to the rasp members, especially if the housing wall is made transparent.

Operation

Figure 8:
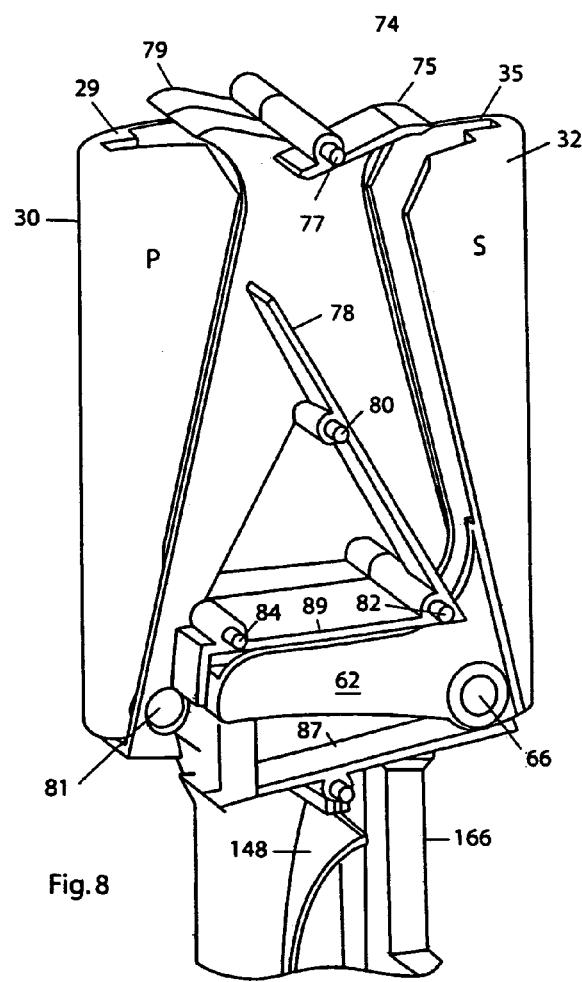

With reference to FIGS. 7, 8 and 12, as well as FIGS. 1 through 5, the two bins are filled with condiments, such as coarse salt in one bin, and peppercorns in the other bin.

When it is desired to dispense one of the substances, the toggle lock mechanism 52 at the top of the unit is operated to disable one of the levers 30, 32 and enable the other. Then the operator squeezes the handles 30 and 32, preferably with the fingers gripping the one of the levers which is operable, and dispenses ground condiment through the bottom opening of the unit 20.

Then, when it is desired to dispense the other of the two condiments, the toggle switch 52 is operated to lock the other of the levers and operate and make one of them operable so as to enable the dispensing of that condiment by operating the corresponding lever.

Reference to FIGS. 7 and 8 show the square openings 35 and 29 in the upper ends of the levers 30 and 32. The projection 47 and 49 (see FIG. 6) fit into one of these holes to lock that lever to prevent its operation. FIG. 7 shows a portion of the mechanism without the housing halves, with the two levers 30 and 32 assembled with the central support 74 and the structure 101.

FIG. 8 shows the same construction, but without the structure 101 in place. It can be seen in FIG. 8 that the surface 78 (along with the surface 142 shown in FIG. 7) serve to stop the forward motion of the lever 32. A similar stop structure is formed for the other lever 30 on the opposite side of the central structure 74.

The return springs for the graters return the levers 30 and 32 to the upper most position against the stop 89 by pushing upwardly on the grater structures 150, 152 whose upper ends abut against the arm 62 or 70 of one of the levers to return it to its starting position. The surface 87 serves as a downward stop for the arm 62 or 70.

It can be seen from the foregoing that the grinder/dispenser meets the objectives set forth above. The grinding/dispensing unit is sleek and uncluttered with protrusions from the top. Furthermore, the selection mechanism for selecting which of the condiments is to be dispensed can be operated with one hand—the same hand that is used to operate the dispensing levers.

The grinder/dispenser dispenses significantly augmented quantities of condiments on each stroke, thus making the dispensing of a given quantity of condiment faster and easier.

The above description of the invention is intended to be illustrative and not limiting. Various changes or modifications in the embodiments described may occur to those skilled in the art. These can be made without departing from the spirit or scope of the invention.

What is claimed is:

1. A device for grinding and dispensing of condiments, said device comprising
   (a) a support body,
   (b) at least two separate condiment grinding and dispensing mechanisms mounted to said body,
   (c) each of said mechanisms including a rasp member for grinding one of said condiments, an upright lever pivotably mounted in said support body and movable to drive said rasp member to grind said condiment by squeezing said lever by hand.
   (d) a locking mechanism for selectively locking one of said levers to prevent it from driving one of said rasps while the other of said levers is operable.

2. A device as in claim 1 in which said levers are mounted on opposite sides of said support body and are grippable simultaneously by one hand.

3. A device as in claim 1 in which said locking mechanism comprises a toggle device with two actuating surfaces, the depression of one of said surfaces blocking one of said levers while unblocking the other of said levers.

4. A device as in claim 3 in which one of said surfaces is marked to indicate salt and the other is marked to indicate pepper.

5. A device as in claim 3 in which said toggle device comprises a toggle member having opposed ends and a pivot axis between said ends and being pivoted in said body to rotate about said axis, each of said levers having an upper end with a receptacle, and said toggle member having projections at said ends positioned to enter one of said receptacles to lock it in place when one of said ends is depressed.

6. A device as in claim 1 in which one of said condiments is peppercorns.

7. A device as in claim 6 in which the other of said condiments is coarse salt.

8. A device as in claim 1 in which each of said levers is mounted to move in a plane parallel to and spaced from the plane in which the other of said levers moves.

9. A device as in claim 1 in which the directions of motion of said levers are opposite one another, and each of said levers is pivoted to rotate in said body about a pivot axis at the lower end of said lever, and has an arm extending transversely from adjacent said lower end, said arm contacting one of said rasp members, and a pair of resilient members for returning said rasp upwardly to a starting position after having been driven by said arm downwardly, and thereby returning said lever to a starting position.

10. A device as in claim 1 in which said support body includes a housing in which said mechanisms are housed, said housing having a straight vertical side wall with angular cut-away areas on opposite sides thereof, with one of said levers being positioned in each of said cut-away areas, whereby said levers can be moved into said housing by a substantial distance in order to actuate said grinding mechanisms.

11. A device as in claim 10 in which said mechanisms are spaced apart from one another in said housing, and including separate storage bins for said condiments, said bins being located in the space between said mechanisms.

12. A device as in claim 11 including a separate return spring for each of said rasp members, each of said springs being located between said rasp member and a side wall of said housing.

* * * * *